United States Patent
Davis et al.

(10) Patent No.: US 11,050,450 B2
(45) Date of Patent: *Jun. 29, 2021

(54) SYSTEM, APPARATUS AND METHOD FOR HARDWARE AND SOFTWARE SUPPORT OF RADIO FUNCTIONALITY

(71) Applicant: Silicon Laboratories Inc., Austin, TX (US)

(72) Inventors: Shawn Michael Davis, Cedar Park, TX (US); Jan Schnepp, Austin, TX (US); Aaron Scott Blank, Elgin, TX (US)

(73) Assignee: Silicon Laboratories Inc., Austin, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/028,517

(22) Filed: Jul. 6, 2018

(65) Prior Publication Data
US 2020/0014413 A1  Jan. 9, 2020

(51) Int. Cl.
*H04B 1/16* (2006.01)
*H04H 40/27* (2008.01)

(52) U.S. Cl.
CPC .......... *H04B 1/16* (2013.01); *H04H 40/27* (2013.01); *H04H 2201/11* (2013.01); *H04H 2201/12* (2013.01); *H04H 2201/20* (2013.01)

(58) Field of Classification Search
CPC .......... H04B 1/006; H04B 1/109; H04B 1/16; H04B 1/086; H04B 1/26; H04B 7/18517; H04B 7/1858; H04B 7/18591
USPC ........................................................ 455/150.1
See application file for complete search history.

(56) References Cited

U.S. PATENT DOCUMENTS

| 7,990,480 | B2 * | 8/2011 | Naito | H04N 5/4401 348/731 |
| 2005/0122428 | A1 * | 6/2005 | Kawakami | H04B 1/08 348/553 |
| 2012/0042157 | A1 * | 2/2012 | Leclercq | G06F 21/72 713/2 |

FOREIGN PATENT DOCUMENTS

WO    WO-2009035273 A2 *    3/2009    ............ H04N 5/46

OTHER PUBLICATIONS

Silicon Labs, "Si47942 Data Short," Preliminary Rev. 0.1, 5 pages, at least as early as Jun. 2018.

(Continued)

*Primary Examiner* — Ajibola A Akinyemi
(74) *Attorney, Agent, or Firm* — Trop, Pruner & Hu, P.C.

(57) ABSTRACT

In one example, a system includes: a circuit board; at least one tuner adapted on the circuit board to receive and process a radio frequency (RF) signal to output a downconverted modulated signal; a processor adapted on the circuit board to demodulate the downconverted modulated signal, process the demodulated downconverted signal and output an audio signal; a location on the circuit board to receive a demodulator circuit; and a shunt element adapted on the circuit board to direct the downconverted modulated signal from the at least one tuner to the processor when the system does not include the demodulator circuit.

20 Claims, 5 Drawing Sheets

(56) References Cited

OTHER PUBLICATIONS

Silicon Labs, "Si47951-52 Data Short," Preliminary Rev. 0.1, 5 pages, at least as early as Jun. 2018.
Silicon Labs, "Si4692 Data Short," Preliminary Rev. 0.1, 5 pages, at least as early as Jun. 2018.
Silicon Labs, "Silicon Labs' Radio Tuner ICs Drive Software-Defined Radio Solution for Renesas's "R-Car" SoC In-Vehicle Infotainment System," 3 pages, Oct. 31, 2017 (http://news.silabs.com/news-briefs?item=16).

* cited by examiner

SYSTEM, APPARATUS AND METHOD FOR HARDWARE AND SOFTWARE SUPPORT OF RADIO FUNCTIONALITY

BACKGROUND

Radios are incorporated into ever more types of end user products. And over time, radios have transitioned from primarily analog circuitry to mixes of analog and digital circuitry. In addition, while many radios are implemented fully in hardware, some radios are implemented by way of software, as a so-called software-defined radio (SDR).

One common implementation of a radio is within an automotive environment. In many situations, a vehicle manufacturer does not design or manufacture the radio or other entertainment system. Instead, oftentimes a third party designs this system. As technology advances, these third parties seek to incorporate greater functionality and do so at lower costs. To this end, some manufacturers seek to replace at least certain hardware with software. However, there is an inherent design risk in making changes to these systems, particularly as a given system design is typically entrenched. When a decision is made for a hardware or software implementation of particular functionality it is typically immutable, in that an entirely new design would be required to change the determined arrangement.

SUMMARY OF THE INVENTION

In one aspect, a system includes: a circuit board; at least one tuner adapted on the circuit board to receive and process a radio frequency (RF) signal to output a downconverted modulated signal; a processor adapted on the circuit board to demodulate the downconverted modulated signal, process the demodulated downconverted signal and output an audio signal; a location on the circuit board to receive a demodulator circuit; and a shunt element adapted on the circuit board to direct the downconverted modulated signal from the at least one tuner to the processor when the system does not include the demodulator circuit.

In an example, when the system comprises the demodulator circuit to demodulate the downconverted modulated signal, the shunt element is not present and the processor is not configured to demodulate the downconverted modulated signal. The demodulator circuit may include: a first demodulator circuit to demodulate a first downconverted modulated signal from a first tuner to a first demodulated signal; a second demodulator circuit to demodulate a second downconverted modulated signal from a second tuner to a second demodulated signal; and a linker circuit to seamlessly link the first demodulated signal and the second demodulated signal and to send the seamlessly linked demodulated downconverted signal to the processor.

In an example, the processor includes a first processing engine to execute demodulation code to perform the demodulation, the demodulation code provided by a designer of the demodulator circuit. A non-volatile storage may store the demodulation code. The non-volatile storage may further store a radio stack having: a control application programming interface to interact with a radio application; the demodulation code, when the system does not include the demodulator circuit; a topology selection module to control interaction with a plurality of tuners; and an implementation selection module to control interaction with the demodulator circuit when present, and with the demodulation code when the demodulator circuit is not present. The presence or absence of the demodulator circuit is not visible to the radio application. The radio stack may further include: at least one first driver to interface with the demodulator circuit, when present, via a serial link; and at least one second driver to interface with the at least one tuner, when the demodulator circuit is not present, via a second link. The shunt element may be, for example, a zero ohm resistor.

In another aspect, a non-transitory computer readable storage medium may include instructions that when executed cause a system to: receive, in a radio stack in execution on a processor, a request for a selected radio station from a radio application; determine one or more control parameters for a demodulator to demodulate content of the selected radio station; and determine whether demodulation is to be performed internally to the processor and in response to a determination that the demodulation is to be performed internally to the processor, send the one or more control parameters to an internal processing engine of the processor to execute a software defined demodulator, where the processor is incorporated on a circuit board that is designed to accommodate a hardware demodulation circuit coupled to the processor.

In an example, instructions may be stored to send the one or more control parameters to the hardware demodulation circuit, when it is determined that the demodulation is to be performed in the hardware demodulation circuit. The instructions may further cause the system to send the one or more control parameters to the hardware demodulation circuit via a physical interface application programming interface of the radio stack, when it is determined that the demodulation is to be performed in the hardware demodulation circuit.

In an example, instructions may be stored to: dynamically determine to perform the demodulation internally to the processor for demodulating signals of a first modulation scheme; and dynamically determine to perform the demodulation in the hardware demodulator circuit for demodulating signals of a second modulation scheme. The instructions may further cause the system to: dynamically determine to perform the demodulation internally to the processor when available resources are present in the processor; and dynamically determine to perform the demodulation in the hardware demodulator circuit when the available resources are not present in the processor. The software defined demodulator may be demodulator code ported from the hardware demodulation circuit to the radio stack. In yet another aspect, a system includes: at least one antenna to receive at least one RF signal; at least one tuner coupled to the at least one antenna to receive and process the at least one RF signal to output a downconverted modulated signal; a processor coupled to the at least one tuner to demodulate the downconverted modulated signal when the system does not include a hardware demodulator circuit, the processor further to process the demodulated downconverted signal and output an audio signal; an audio processor coupled to the processor to process the audio signal and output a processed audio signal, where the at least one tuner is adapted on a first layout portion of a circuit board, the processor is adapted on a second layout portion of the circuit board and the audio processor is adapted on a third layout portion of the circuit board, the circuit board further including a fourth layout portion to which the hardware demodulator circuit is adapted when included in the system, the circuit board further including first interconnect circuitry to couple the at least one tuner to the hardware demodulator circuit when the hardware demodulator circuit is included in the system and second interconnect circuitry to couple the hardware demodulator circuit and the processor when the hardware demodulator circuit is included in the system; and an interconnection member to couple the at least one tuner to the processor when the system does not include the hardware demodulator circuit.

In an example, when the system comprises the hardware demodulator circuit to demodulate the downconverted modulated signal, the interconnection member is not present and the processor is not configured to demodulate the downconverted modulated signal. The processor may include a first processing engine to execute demodulator code to perform the demodulation, the demodulator code provided by a designer of the hardware demodulator circuit. The system may further include a non-volatile storage to store a radio stack, the radio stack comprising: a control application programming interface to interact with a radio application; the demodulator code, when the system does not include the hardware demodulator circuit; a topology selection module to control interaction with the at least one tuner; and an implementation selection module to control interaction with the hardware demodulator circuit when present, and with the demodulator code when the hardware demodulator circuit is not present.

In an example, the interconnection member may be one or more switches to enable coupling of at least a portion of the first interconnect circuitry with at least a portion of the second interconnect circuitry.

DETAILED DESCRIPTION

In various embodiments, at least portions of radio functionality for an entertainment system such as a vehicle infotainment system, radio head unit or so forth, may be flexibly provided by way of software, hardware or combinations of hardware and software. Embodiments are applicable to many different types of systems for use in homes, businesses or other establishments or for mobile use.

For purposes of illustration, representative embodiments are discussed in the context of vehicle-located systems. Such systems may take the form of original equipment manufacturer (OEM) entertainment systems, either provided by a vehicle manufacturer or an OEM supplier to the vehicle manufacturer. In other cases, such systems may take the form of after-market systems that a consumer may purchase and install into a vehicle. While such vehicle systems are described for exemplary purposes and may desirably leverage the flexibility of design options afforded by embodiments herein, of course the techniques for providing hardware and/or software-based radio functionality are applicable to other system types.

In embodiments at least certain radio functionality such as demodulation functionality can be designed into the system in a manner to enable, in system operation, only a single one of the hardware or software implementation of the demodulator functionality. Or in other embodiments, the system design may accommodate dynamic runtime selection of hardware or software demodulation functionality.

To this end, an integrated circuit (IC) designer may provide both a hardware version of radio functionality, e.g., as implemented in a given IC, and a software version of the radio functionality, e.g., as implemented in code to perform such radio functionality. In embodiments herein, note that the radio functionality to be flexibly provided may be demodulator functionality. Of course additional radio functionality can be provided by way of software. As additional examples, various filtering and other radio processing such as data service decoders, audio decoders, available service tracking, audio post processing, multi-source audio time and level alignment, among others, may be performed in software in embodiments.

Note that in the art the term "software defined radio" is typically used to refer to a complete radio, other than radio frequency (RF) and downconversion circuitry that is implemented by way of software. Instead that term and the additional term "software defined demodulator" are used herein to refer to particular and limited portions of radio functionality that are implemented by way of software. Understand that this software, in whatever form it is provided, is executed on some type of hardware, typically a programmable hardware element such as a general-purpose processor or so forth. As such, the IC designer may provide to an entertainment system designer a selection of one or more ICs that include demodulator circuitry such as application specific integrated circuits (ASICs) or so forth. For example, an IC designer may market multiple versions of demodulator ICs, each having different features such as capabilities for accommodating different radio standards, quality, size, capabilities, cost and so forth. In addition, the IC designer also may further provide one or more versions of the demodulator functionality to the system designer as code to perform demodulation operations that correspond to demodulation performed in one or more of these ICs.

In turn, the system designer may design a single printed circuit board for its entertainment system that includes physical layout locations for front end radio circuitry (such as one or more tuners implemented as standalone ICs), a general-purpose processor such as a system on chip (SoC), digital signal processor (DSP) or so forth, and additional components for additional functionality of the system, such as a navigation system, display system, communication system, network system and so forth. Note that in some cases, a system designer may design this single printed circuit board to be used for many different actual entertainment system implementations. For example, this single printed circuit board may be used for options ranging from basic low-end radio systems to high-end fully-featured entertainment systems.

As such, in certain cases this single printed circuit board may include a layout that provides locations for multiple hardware components (e.g., ICs, connectors and so forth). For some systems, certain components for use in a more fully featured system may not be included in a bill of materials for a more basic system. And in addition, it is equally possible that for other components such as general-purpose processor, tuner or so forth, different tiers of entertainment systems may use different, but typically pin-compatible, components. As such, for a more basic system, more basic cheaper less performant tuners, processors or so forth are present. Instead for a more advanced or fully featured system, higher quality, more fully featured components are present.

As to the flexible provision of demodulator functionality, understand that while a single circuit board design layout may include a location on the board for a demodulator IC, a particular system offering may or may not include the demodulator IC, based on design choices. That is, for purposes of reducing a total bill of materials (BOM), a separate demodulator IC may not be provided and demodulator functionality instead can be implemented within code that executes on a general-purpose processor.

However, should the system designer determine, during the course of design of a particular version of its system, that the general-purpose processor does not have sufficient resources (such as in terms of available instruction execution cycles, e.g., millions of instructions per second (MIPS)) to accommodate this demodulation functionality, instead that system can be populated with the demodulator IC. Different manners of flexibly using a single circuit board design for system versions both having and not having a standalone demodulator IC are possible. In one embodiment, during manufacture, should a particular circuit board not be populated with a demodulator IC, a zero ohm resistor or other shunt mechanism, or interconnection member may be provided to directly couple a tuner output to the general-purpose processor. Instead, when a demodulator IC is populated onto the circuit board no such component is provided, and interconnect circuitry of the circuit board design (e.g., interconnects formed on one or more layers of the circuit board) is configured to provide a first path from tuner to demodulator IC and a second path from demodulator IC to general-purpose processor.

With embodiments herein, a system architecture is provided that enables a migration process for radio functionality from hardware to software in which a hardware-based solution can be included in a design originally set up for a software-based solution using a single control application, reducing migration time and risk. Stated another way, embodiments provide techniques to enable compatibility between hardware and software implementations to provide system designers with great flexibility for selection of hardware or software-based control with less risk. In this way, during a design process, particular functionality may be determined to occur in hardware instead of software, and then switch back to software instead of hardware, in a flexible and easy manner (and vice-versa). As such, there can be minimal bill of material and software compile option changes when such design-time decisions are made, avoiding costs of complete redesign of a system. Embodiments may thus greatly reduce project risk and cost that otherwise would be incurred in effecting such changes. And as a result, a much easier migration path between hardware and software can occur instead of forcing an initial decision for one or the other, all the while maintaining a highest level of a software arrangement, e.g., a radio application, to be the same. Note that this software may be implemented as a common control interface, described herein as a system control interface, for a radio application so that a compile-time option can occur to either generate commands to control external hardware or use internal software calls to control a software implementation. As such, whether hardware or software is used for particular functionality, the overall system behavior, control software and radio performance is directly compatible.

Figure 1A:
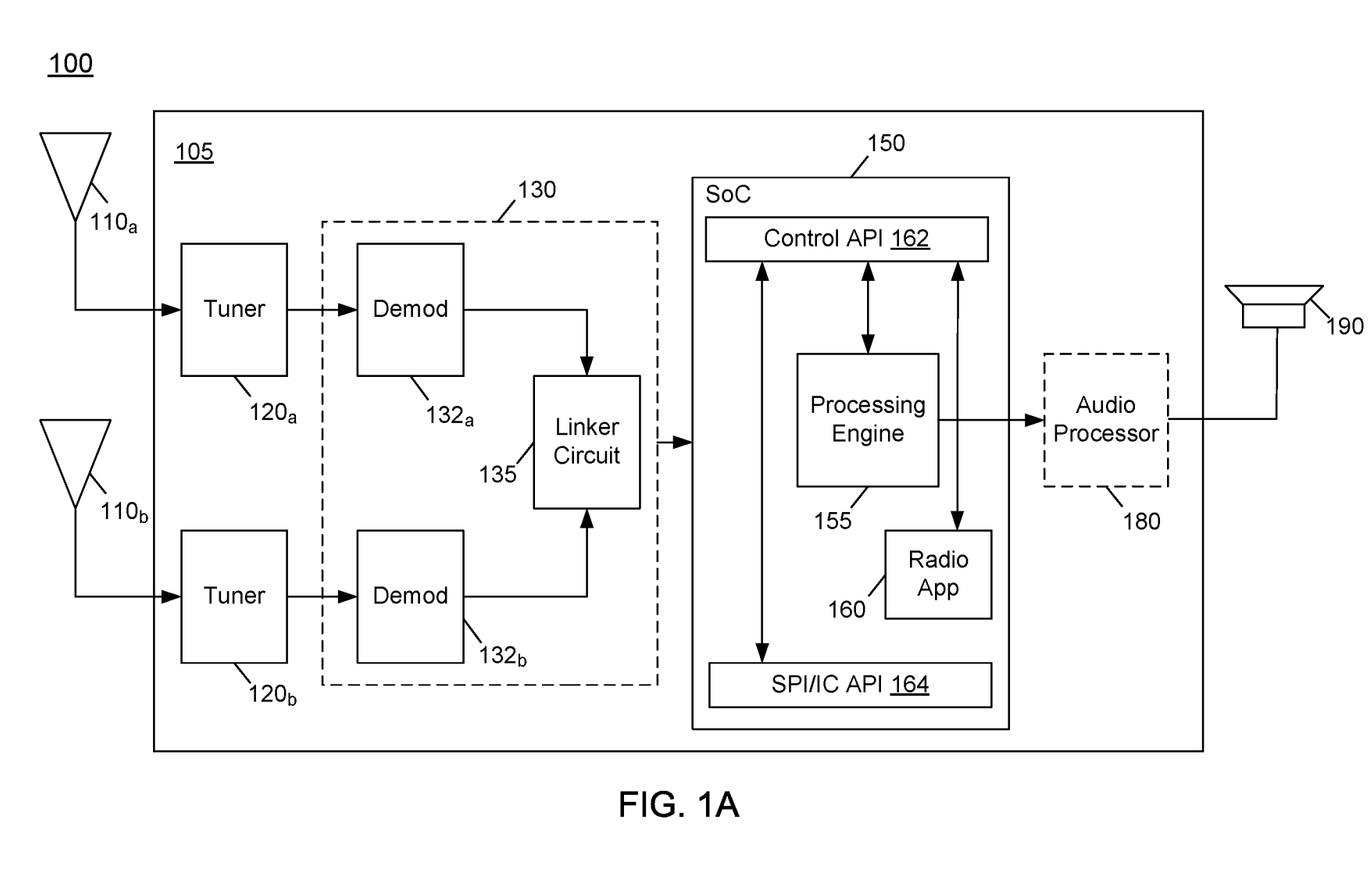
FIG. 1A is a block diagram of a system in accordance with an embodiment.

Referring now to FIG. 1A, shown is a block diagram of a system in accordance with an embodiment. As shown in FIG. 1A, system 100 is at least a portion of a vehicle infotainment system. As illustrated, system 100 includes components adapted on a circuit board 105, as well as additional components that may be located in other portions of a vehicle. In different implementations, such components can be adapted on circuit board 105 via typical connection mechanisms, including surface mount connections, ball grid connections or through hole connections, among others. In an example system, circuit board 105 may be implemented in a radio head unit of the vehicle, while additional components may be otherwise located.

In the embodiment shown in FIG. 1A, incoming radio frequency (RF) signals are received by multiple antennas $110_a$, $110_b$ (generically antennas 110). Understand while two antennas are shown for purposes of discussion, in different implementations a vehicle may be adapted with only a single antenna or more than two antennas, as appropriate for a given tier of radio solution, as well as desired bands of service. For purposes of discussion herein, assume that antennas 110 are configured to receive digital radio communications in accordance with one or more digital radio standards such as digital audio broadcasting (DAB), HD radio, digital radio mondiale (DRM) or so forth, analog radio stations (e.g., AM and FM) and potentially other broadcast signaling, including video signaling, e.g., according to a digital media broadcast (DMB) standard.

Received RF signals from antennas 110 are in turn provided to corresponding tuners $120_a$, $120_b$ (generically tuner 120). In various embodiments, tuners 120 may be implemented in one or more integrated circuits that are adapted in particular layout portions of circuit board 105. Tuners 120 may be multi-band tuners to receive and process RF signals of different bands. In general, tuners 120 may include RF front end circuitry such as a low noise amplifier (LNA) and other gain control circuitry, mixer, filter, digitizer and so forth that operate to receive and process the RF signal and generate a resulting digitized signal at a downconverted frequency. For example, tuners 120 may be configured to output signals at baseband, zero intermediate frequency (ZIF) or other downconverted level. In embodiments, tuners 120 may output such signals in digitized form.

As further illustrated in FIG. 1A, resulting digitized signals are provided to a demodulator 130. In embodiments, demodulator 130 may be implemented as a standalone IC, which may be implemented as an ASIC as one example, adapted in a particular layout portion of circuit board 105. Note that as shown in FIG. 1A, demodulator 130 is illustrated in dashed form. This is so, since for a particular implementation of infotainment system 100, the demodulator IC may not be present. In any case, as illustrated in FIG. 1A, demodulator 130 includes multiple demodulation circuits $132_a$, $132_b$ (generically demodulator circuit 132), each to receive incoming signal information from one of tuners $120_a$, $120_b$. In turn, demodulator circuits 132 operate to demodulate the incoming signals, which are received in a modulated form. In general, demodulator circuits 132 may include various circuitry including asynchronous sample rate converters, decoder circuitry and so forth. As such, demodulator circuits 132 output demodulated signals, which are provided to a linker circuit 135.

In embodiments, linker circuit 135 may seamlessly link demodulated signals of the two paths when appropriate. For example, for DAB radio communication, a given radio station may transmit at multiple frequencies. As a vehicle drives along a route, it may first tune to the radio station at a first frequency (e.g., as received and processed within tuner $120_a$ and demodulator circuit $132_a$). However, as the vehicle continues along its route assume that this signal becomes degraded. As a result, better signal quality may be realized via signals received at another frequency via tuner $120_b$ and demodulator circuit $132_b$. As such, linker circuit 135 may seamlessly transition its output to be directed from a given one of demodulator circuits 132 to the other in a seamless fashion (e.g., by providing buffering resources or so forth) such that the transition from one frequency to another occurs seamlessly to a listener.

Still with reference to FIG. 1A, demodulated signals output from demodulator 130 are provided to a system on chip (SoC) 150, which is a main processor of infotainment system 100, and which may be adapted on another layout portion of circuit board 105. As illustrated in FIG. 1A, SoC 150 includes a processing engine 155. Although a single processing engine is shown for ease of illustration, understand that in various implementations, multiple processing engines may be provided. As examples, processing engine 155 may be implemented as one or more general-purpose processor cores, one or more DSPs, and/or one or more other programmable logic circuits.

SoC 150 is additionally shown to include a radio application 160, which in an embodiment may be a high level radio application of the system. Radio application 160 may act as an interface to receive user input (e.g., a request for a given radio station) and provide instructions to additional components to effect the requested functionality. To this end, SoC 150 is further shown to include a control application programming interface (API) 162 that acts as a top level of a software stack for the radio functionality. Control API 162 may be configured to communicate with radio application 160 and in turn abstract underlying layers of the radio software stack and the radio hardware. As will be described herein, control API 162 and lower layers of the radio software stack may, in a manner transparent or invisible to radio application 160, handle certain radio functionality such as demodulation functionality in hardware or software depending upon a particular system implementation.

To enable communication with underlying radio hardware (such as demodulator 130 and tuners 120), SoC 150 may further include a serial peripheral interface (SPI) or Inter-Integrated Circuit (I²C) API 164 that acts as a physical interface between the software stack and additional hardware of system 100. Note that while radio application 160, control API 162 and SPI/I²C API 164 are illustrated as separate components within SoC 150, understand that each of these components in fact may be implemented as software and/or firmware that executes on processing engine 155 or other programmable circuitry within SoC 150. As such, whether implemented as software or firmware, these components may include instructions that are stored in a non-transitory storage medium. Such storage medium may be implemented within SoC 150 itself such as an internal non-volatile memory or an external memory such as an external flash memory of system 100.

As further shown in FIG. 1A, processing engine 155 outputs audio signals which may be provided to an optional audio processor 180. Audio processor 180 may perform additional audio processing such as post-processing, balance control, fading, and so forth. In turn, audio processor 180 outputs audio signals to one or more speakers 190. Understand while shown at this high level in the embodiment of FIG. 1A, many variations and alternatives are possible.

Figure 1B:
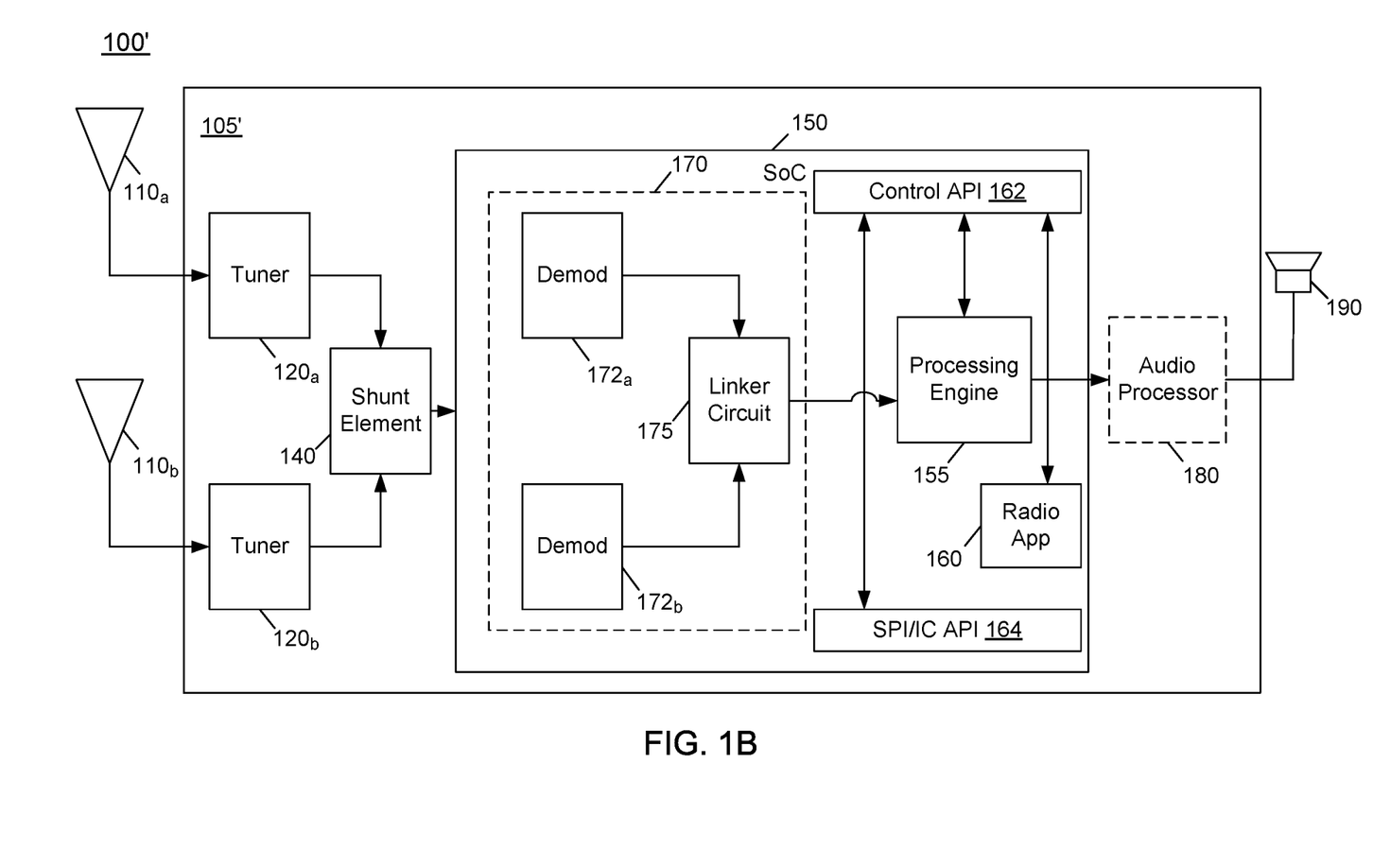
FIG. 1B is a block diagram of a system in accordance with another embodiment.

In another implementation, a system designer may choose to not incorporate a hardware demodulator and instead perform demodulation operations using software. Referring now to FIG. 1B, shown is a block diagram of a system in accordance with another embodiment. As illustrated in FIG. 1B, a circuit board 105' is present, and may be part of a vehicle infotainment system 100'. Note that system 100' may be a different version of a vehicle infotainment system than system 100. For example, system 100' may include different components, additional (or less) functionality or so forth. However, in the implementation of FIG. 1B, hardware demodulator 130 is not present and instead demodulator functionality may be incorporated within SoC 150 by way of provision of code to perform the demodulation functionality. Nonetheless, printed circuit board 105' may have the same design as printed circuit board 105 of FIG. 1A. As such, a single circuit board can be designed, and depending upon design choices for a particular implementation, hardware radio functionality such as demodulator functionality can be implemented in hardware or software.

As further illustrated in FIG. 1B, a shunt mechanism or element 140 may be provided to provide routing from tuners 120 directly to SoC 150. Note that shunt element 140 in an embodiment may be implemented as a zero ohm resistor that couples between the output of tuners 120 and an input to SoC 150. In some cases another type of interconnection member such as controllable switches may be used to provide this direct interconnection path where the switches are set in a first configuration when a hardware demodulator (e.g., demodulator 130 of FIG. 1A) is present and set in a second configuration when a hardware demodulator is not present (as in FIG. 1B). In other respects, circuit board 105' may be configured the same as circuit board 105 of FIG. 1A.

As further illustrated in FIG. 1B, SoC 150 includes a software defined demodulator 170. In the embodiment shown, SDR demodulator 170 includes multiple demodulator components $172_a$, $172_b$ and a linker circuit 175. In embodiments, SDR demodulator 170 and its constituents components may be implemented in software that is stored in a non-transitory storage medium. Further understand that in operation, SDR demodulator 170 may execute on processing engine 155 or another programmable processing circuit, such as a processor core, DSP, microcontroller of so forth.

Figure 2:
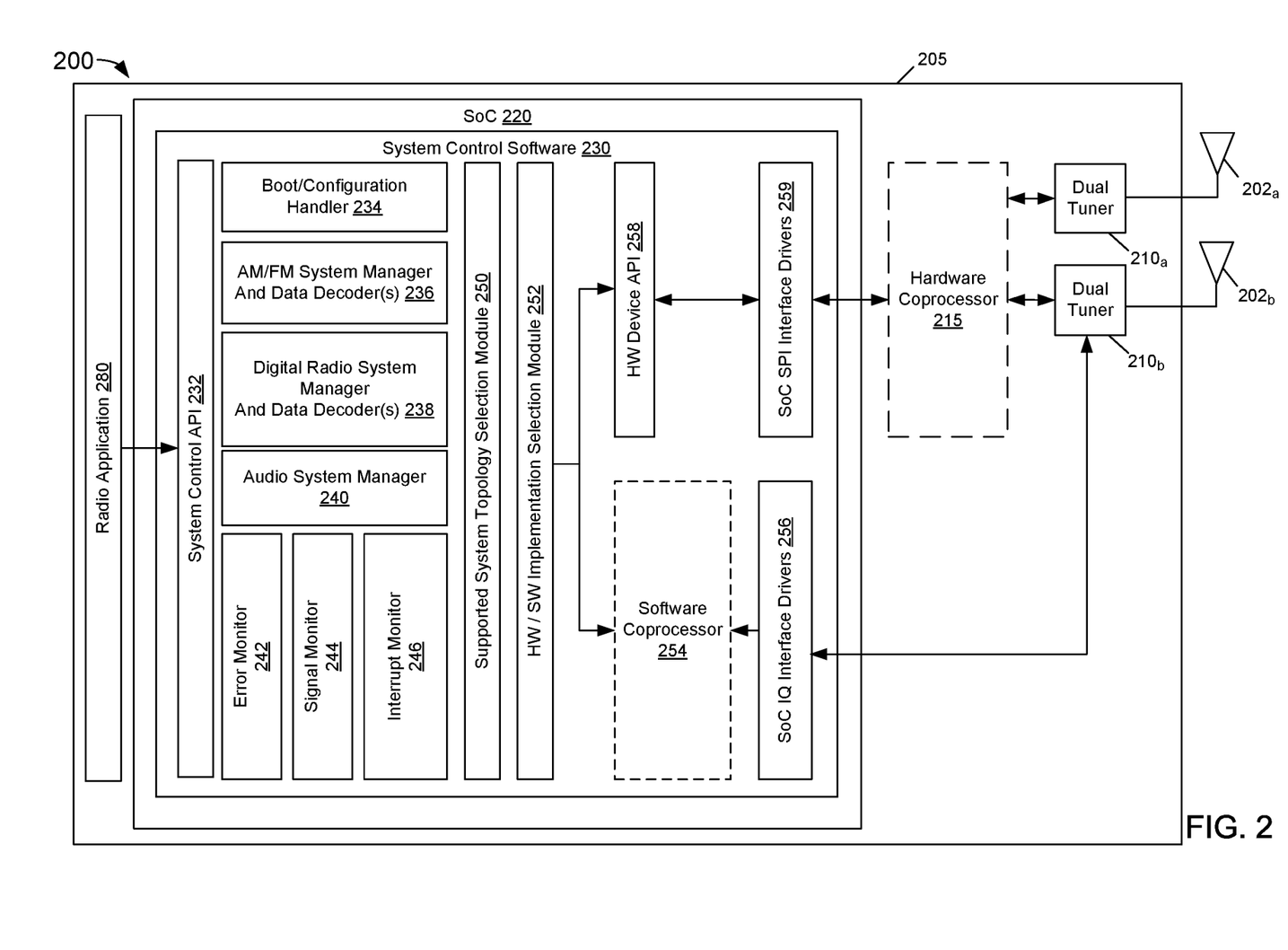
FIG. 2 is a block diagram of portion of a system in accordance with another embodiment.

Referring now to FIG. 2, shown is a block diagram of portion of a system in accordance with another embodiment. As shown in FIG. 2, system 200 provides further details including both hardware and software components of a system. As with the embodiments discussed above, system 200 may be implemented on a circuit board 205. Hardware components are adapted to circuit board 205 such as by way of surface mount, ball grid connections or so forth. These components include tuners $210_a$, $210_b$, which receive RF signals from antennas $202_a$, $202_b$. Circuit board 205 further includes a hardware coprocessor 215 (which in an embodiment may be a demodulator IC, such as a given ASIC design), and an SoC 220. Note that hardware coprocessor 215 is shown in dashed form to illustrate its optional nature.

To provide interaction during operation, a radio application 280 is present. Radio application 280 may be a high-level application provided by the system designer to act as an interface between a user and the underlying hardware. In turn, radio application 280 interfaces with a system control software 230 that may execute in SoC 220. In embodiments, system control software 230 may be provided by the radio equipment manufacturer, e.g., an IC designer that designs tuners 210 and demodulator 215.

As shown in FIG. 2, radio application 280 interfaces with a system control API 232, which acts as a highest level of a software stack of system control software 230 also referred to as a "radio stack," where this stack does not include the radio application, and acts as an interface to the hardware or software radio components. System control API 232 may thus provide an abstraction to radio application 280 that abstracts away details of the implementation of radio functionality. Stated another way, the actual mechanisms that implement radio functionality remain invisible and transparent to radio application 280.

As illustrated, system control API 232 interfaces with underlying layers of system control software 230, including various monitors including an error monitor 242, a signal monitor 244, and an interrupt monitor 246. In general, these monitors may monitor for various conditions, e.g., with regard to errors, signal quality and other metric information, and interrupts, which may be received from underlying hardware or other sources. System control API 232 further interfaces with various handlers, decoders and managers, including a boot/configuration handler 234, which is configured to initiate a boot sequence for this software stack. A system manager and data decoder(s) 236 may provide control functions and decoding for analog broadcast radio schemes such as AM/FM. In turn, a digital radio system manager and data decoder(s) 238 may provide control functions and decoding for digital broadcast radio schemes such as DAB, DRM and so forth. Further, an audio system manager 240 may provide control of audio system behavior by performing the lower level operations which when performed together provide some high level state change to the radio. For example, assume a user wants to select a first service. Audio system manager 240 finds the first service in the service database, tunes the tuner hardware to the correct frequency and begins the demodulator acquisition process and starts any relevant data decoders. The data decoders aggregate and decode the various data packets delivered by the radio protocol to provide a logical result to the main application. For example a DAB radio takes multimedia object transfer (MOT) packets and aggregates them until there is a valid image to display on the screen. Audio system manager 240 also controls audio post processing and handles any audio signal routing configuration necessary for the system.

As further illustrated, system control software 230 also includes modules that provide an ability to interact with radio functionality that may be implemented in hardware, software, or combinations thereof. As illustrated, a supported system topology selection module 250 is configured to enable a vertical scaling of radio functionality. For example, module 250 may control instantiation of multiple tuners or other system components. As such, supported system topology selection module 250 is a software layer to change and/or abstract how many instances of each mode are present in the overall radio system. Stated another way, module 250 abstracts out details of the underlying hardware of a system such as number of antennas, tuners and other hardware circuitry such as demodulators or so forth, as well as details regarding the capabilities of such hardware components. In turn, a hardware/software implementation selection module 252 may be used to control whether given radio functionality (e.g., demodulator functionality) is to be performed in hardware or software (or both). Stated another way, module 252 may be used to control interaction with a hardware demodulation circuit, when it is present in a given system implementation, and instead to control interaction with demodulator code that executes within a generic processor (e.g., an SoC) when the hardware demodulation circuit is not present. In this way, selection module 252 thus abstracts out the hardware/software functionality breakdown, such that the presence or absence of a demodulator circuit implemented in hardware is not visible to radio application 280.

Depending upon control implemented by way of modules 250, 252, control information may be provided to a software coprocessor 254, which may be a code block to perform demodulation in the case of a software defined demodulator. Instead, in the case of hardware demodulation performed by hardware coprocessor 215, selection module 252 may control communication via a hardware device API 258 and corresponding physical interface drivers 259, which in an embodiment may be implemented as SPI interface drivers. In an embodiment, when present, hardware coprocessor 215 may communicate with SoC 220 via a serial physical link, e.g., an SPI link, that interfaces with SoC 220 via drivers 259. Note further that when a software demodulation implementation is selected, communication may be effected directly between tuners 210 and software coprocessor 254 via corresponding SoC IQ interface drivers 256. Understand while shown at this high level in the embodiment of FIG. 2, many variations and alternatives are possible.

Figure 3:
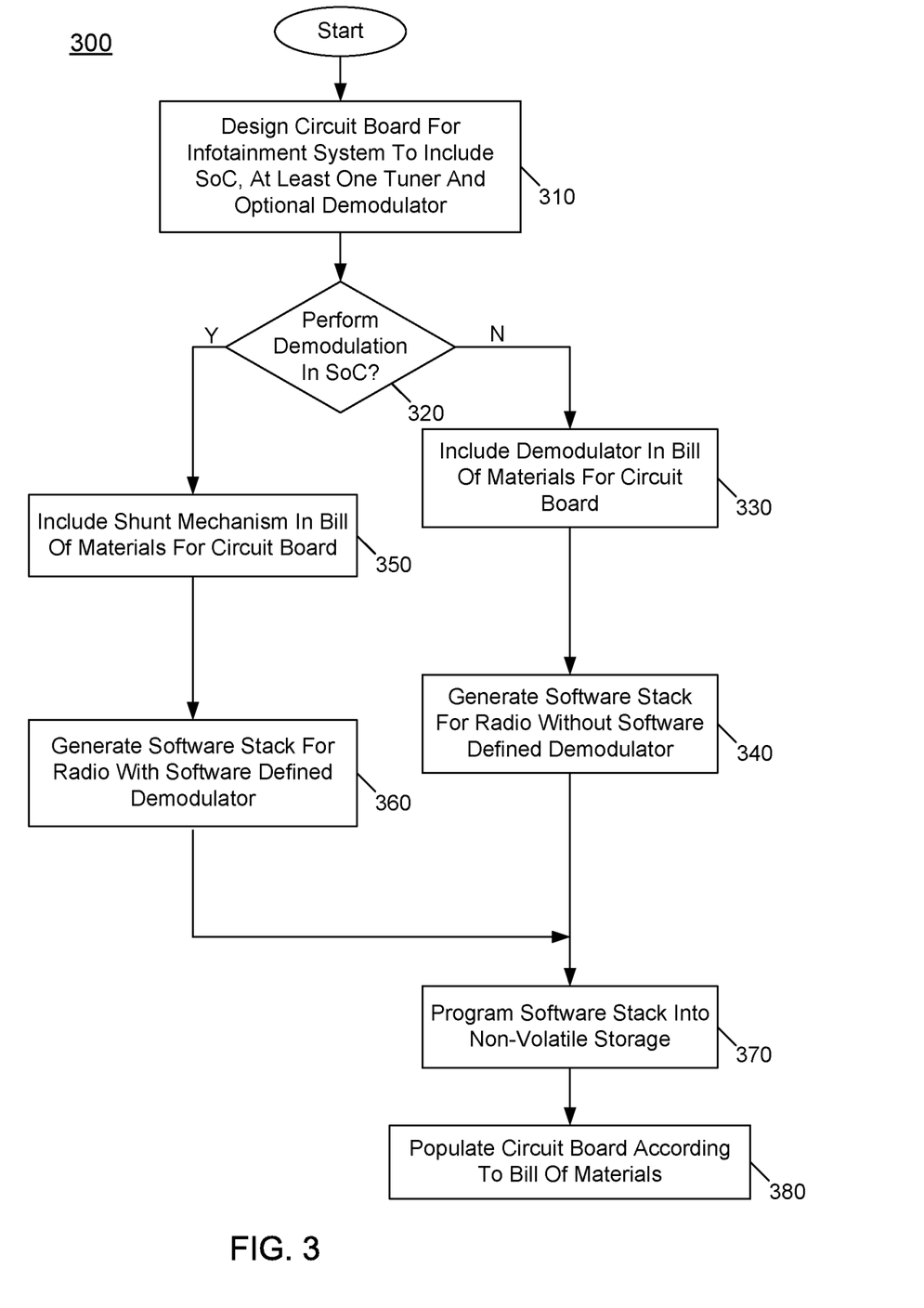
FIG. 3 is a flow diagram of a method in accordance with an embodiment.

Referring now to FIG. 3, shown is a flow diagram of a method in accordance with an embodiment. More specifically, method 300 is a method for designing a circuit board for implementation in a particular entertainment system. As such, method 300 may be performed during system design and can be used to select appropriate components for incorporation into the system. As illustrated, method 300 begins by designing the circuit board to have a particular layout (block 310). As discussed above, this layout may include various components including radio circuitry such as RF front end circuitry, a general-purpose processor such as an SoC and optionally a demodulator. This layout may thus provide locations on the circuit board for each of these components, and appropriate interconnections between the components.

Still with reference to FIG. 3 next it is determined at diamond 320 whether demodulation is to be performed in the SoC. This design time determination may occur at various stages of a design cycle. As an example, assume that as part of initial design requirements, the decision is to perform demodulation by way of software. As such, control next passes to block 350. There, a shunt mechanism or other interconnection member can be included in the bill of materials for the circuit board. Next at block 360 a software stack can be generated for the radio that includes a software defined demodulator. Note that with the arrangement described herein, an IC designer may provide this code, e.g., by porting its intellectual property (IP) for a given hardware demodulator to the system designer to enable its implementation within the software stack.

Next at block 370 the software stack may be programmed into a non-volatile storage. For example, the circuit board may include a flash memory or other non-volatile memory that can be programmed by the system designer with the radio software stack. Understand that this non-volatile memory may store other information, including boot code for the system and additional software stacks, e.g., for other purposes including navigation functionality, communication functionality and so forth. Finally, at block 380, mass production of circuit boards may occur, with each circuit board populated according to its bill of materials. Note that in this instance where a software defined demodulator is used, the bill of materials does not include a standalone demodulator IC, reducing component costs.

Still referring to FIG. 3, assume instead at diamond 320 it is determined that demodulation is not to be performed in the SoC. This decision may be according to initial design requirements. Or late in a design and validation process the designer may determine that there are insufficient resources within the SoC to handle demodulator functionality. Embodiments enable a rather quick and easy way to provide this demodulator function by way of hardware, without requiring excessive redesigns, additional board layout modifications, validation costs and so forth. Specifically as shown in FIG. 3, in this instance at block 330 the bill of materials is expanded to include a demodulator, as this demodulator location has already been provided for in the circuit board layout. Thereafter at block 340 the software stack is generated without the software defined demodulator functionality, reducing space issues with regard to the code and further providing additional compute resources within the SoC. Thereafter, the software stack is programmed and circuit boards populated as discussed above.

Figure 4:
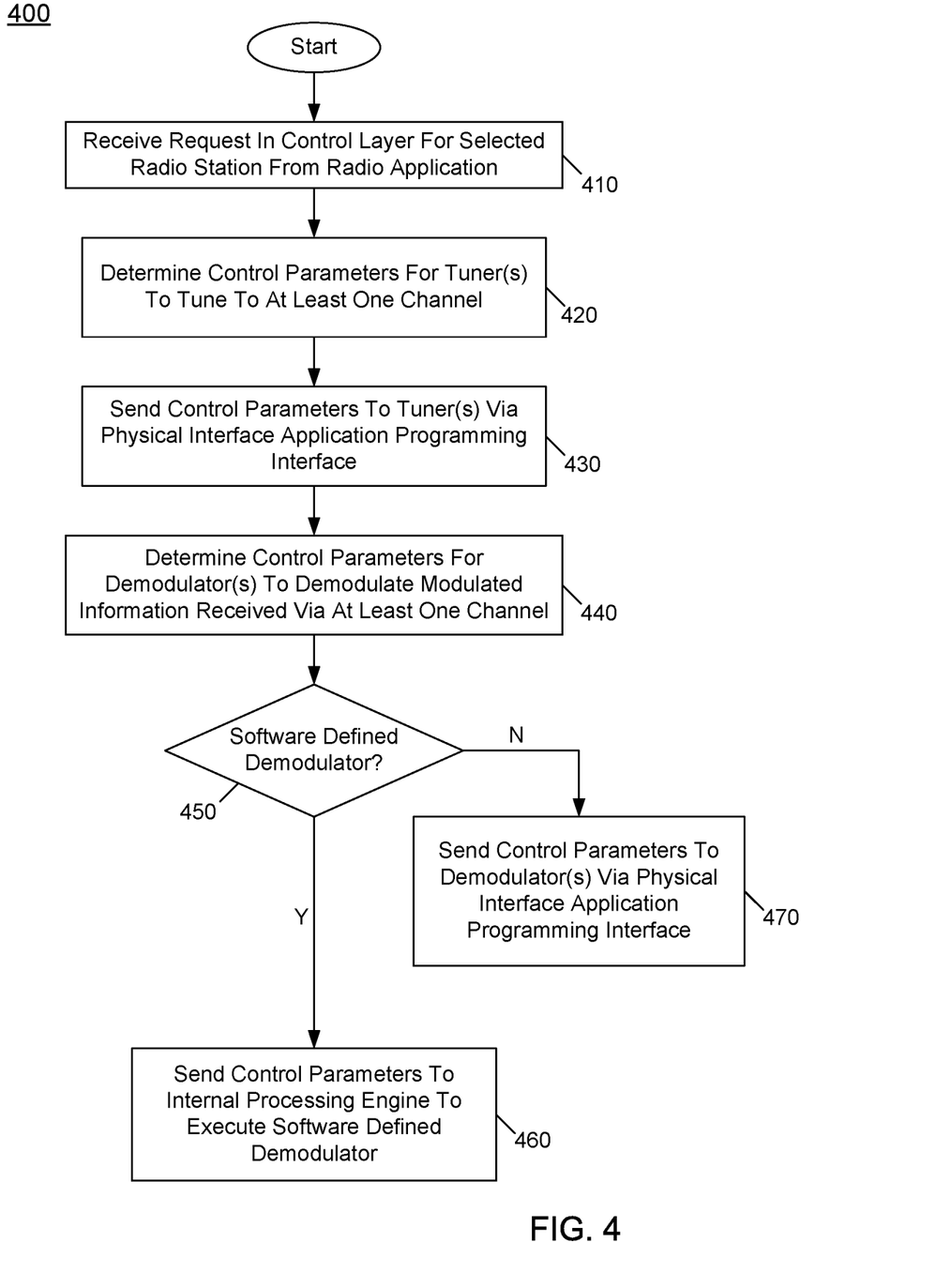
FIG. 4 is a flow diagram of a method in accordance with another embodiment.

Referring now to FIG. 4, shown is a flow diagram of a method in accordance with another embodiment. More specifically, method 400 is a method for operating an entertainment system to provide radio functionality as described herein. As such, method 400 may be performed by hardware circuitry, firmware, software and/or combinations thereof. In a particular embodiment, method 400 may be performed within an SoC or other general-purpose processor that executes a radio software stack. As illustrated, method 400 begins by receiving a request in a control layer of this software stack for a selected radio station (block 410). Note that this request may be received in response to a user selection of a desired radio channel that is received by a high-level radio application, e.g., of the system designer. Next, control parameters for one or more tuners can be determined to tune to at least one channel (block 420). Assume for purposes of discussion a single tuner implementation. Such control parameters may include information regarding the frequency of the desired channel and other parameters such as gain settings, filter settings or so forth. Next control passes to block 430 where these control parameters may be sent to the tuner via a physical interface API. This physical interface API takes these control parameters and places them in a format to be communicated to and understood by the RF circuitry.

Still with reference to FIG. 4, at block 440 control parameters for a demodulator to demodulate modulated information received via this at least one channel also may be determined, so that the demodulator can demodulate content of the selected radio station. Such control parameters may include the type of modulation scheme used for the given channel, the specific audio service content to decode or data service content to send to the appropriate data decoder and so forth.

Still referring to FIG. 4, next it is determined whether there is a software defined demodulator present (diamond 450). This determination may be based on a hard coded, e.g., compile-time decision such that a radio is configured for only one of hardware or software demodulation. Instead in other cases, a run-time decision may be made. For example, a system designer may choose to perform demodulation for certain radio standards in hardware and instead choose to implement others in software. Or it is possible, e.g., based on run-time consumption of resources within an SoC, to offload the demodulator functionality to hardware. In any event, based upon this decision at diamond 450 control passes to a given one of blocks 460 and 470. In these blocks, the determined control parameters are sent to an appropriate destination, namely an internal processing engine (in the case of a software defined demodulator) or via a physical interface API to an external hardware demodulator, to enable the demodulation to be performed. Understand while shown at this high level in the embodiment of FIG. 4, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A circuit board comprising:
a first physical layout location on the circuit board to receive at least one tuner, wherein the at least one tuner is to receive and process a radio frequency (RF) signal to output a downconverted modulated signal;
a second physical layout location on the circuit board to receive a demodulator circuit;
a third physical layout location on the circuit board to receive a processor; and
a fourth physical layout location on the circuit board to receive a shunt element comprising a zero ohm resistor, wherein:
when the circuit board is implemented in a first system that includes the shunt element and does not include the demodulator circuit, the shunt element is to direct the downconverted modulated signal from the at least one tuner to a first processor adapted to the third physical layout location, the first processor to demodulate the downconverted modulated signal, process the demodulated downconverted signal and output an audio signal; and
when the circuit board is implemented in a second system that does not include the shunt element and includes the demodulator circuit, the circuit board is to route the downconverted modulated signal from the at least one tuner to the demodulator circuit, the demodulator circuit to demodulate the downconverted modulated signal and provide the demodulated downconverted signal to a second processor adapted to the third physical layout location, the second processor to process the demodulated downconverted signal and output the audio signal.

2. The circuit board of claim 1, wherein when the circuit board is implemented in the first system, the shunt element is to direct the downconverted modulated signal from the at least one tuner to the first processor via first interconnect circuitry of the circuit board.

3. The circuit board of claim 2, wherein the first interconnect circuitry is formed on one or more layers of the circuit board.

4. The circuit board of claim 1, wherein when the circuit board is implemented in the second system, the circuit board is to route the downconverted modulated signal from the at least one tuner to the demodulator circuit via second interconnect circuitry of the circuit board.

5. The circuit board of claim 4, wherein the second interconnect circuitry is formed on one or more layers of the circuit board.

6. The circuit board of claim 1, further comprising a radio head unit of a vehicle, the radio head unit comprising the circuit board.

7. At least one non-transitory computer readable storage medium comprising instructions that when executed enable a system to:
receive, in a radio stack in execution on a processor, a request for a selected radio station from a radio application;

determine one or more control parameters for a demodulator to demodulate content of the selected radio station; and determine whether demodulation is to be performed internally to the processor and in response to a determination that the demodulation is to be performed internally to the processor, send the one or more control parameters to an internal processing engine of the processor to execute a software defined demodulator, wherein the processor is incorporated on a circuit board that is designed to accommodate a hardware demodulation circuit coupled to the processor and usable in a first system that includes the hardware demodulation circuit to demodulate the content and usable in a second system that includes the processor to demodulate the content and does not include the hardware demodulation circuit.

8. The at least one non-transitory computer readable storage medium of claim 7, further comprising instructions that when executed enable the system to send the one or more control parameters to the hardware demodulation circuit, when it is determined that the demodulation is to be performed in the hardware demodulation circuit.

9. The at least one non-transitory computer readable storage medium of claim 8, further comprising instructions that when executed enable the system to send the one or more control parameters to the hardware demodulation circuit via a physical interface application programming interface of the radio stack, when it is determined that the demodulation is to be performed in the hardware demodulation circuit.

10. The at least one non-transitory computer readable storage medium of claim 7, further comprising instructions that when executed enable the system to:
dynamically determine to perform the demodulation internally to the processor for demodulating signals of a first modulation scheme; and
dynamically determine to perform the demodulation in the hardware demodulator circuit for demodulating signals of a second modulation scheme.

11. The at least one non-transitory computer readable storage medium of claim 7, further comprising instructions that when executed enable the system to:
dynamically determine to perform the demodulation internally to the processor when available resources are present in the processor; and
dynamically determine to perform the demodulation in the hardware demodulator circuit when the available resources are not present in the processor.

12. The at least one non-transitory computer readable storage medium of claim 7, wherein the software defined demodulator comprises demodulator code ported from the hardware demodulation circuit to the radio stack.

13. A system comprising:
at least one antenna to receive at least one radio frequency (RF) signal;
at least one tuner coupled to the at least one antenna to receive and process the at least one RF signal to output a downconverted modulated signal;
a processor coupled to the at least one tuner to demodulate the downconverted modulated signal and to process the demodulated downconverted signal and output an audio signal;
an audio processor coupled to the processor to process the audio signal and output a processed audio signal;
a circuit board, wherein the at least one tuner is adapted on a first layout portion of the circuit board, the processor is adapted on a second layout portion of the circuit board, and the audio processor is adapted on a third layout portion of the circuit board, the circuit board further including a fourth layout portion to which a hardware demodulator circuit may be adapted, the circuit board further including:
first interconnect circuitry to direct the downconverted modulated signal from the first layout portion to the second layout portion; and
second interconnect circuitry to direct the downconverted modulated signal from the first layout portion to the fourth layout portion; and
an interconnection member to cause the downconverted modulated signal to be provided from the at least one tuner to the processor via the first interconnect circuitry.

14. The system of claim 13, wherein the interconnection member comprises a shunt element.

15. The system of claim 14, wherein the shunt element comprises a zero ohm resistor.

16. The system of claim 13, wherein the system comprises a radio head unit of a vehicle.

17. The system of claim 13, wherein the processor comprises a first processing engine to execute demodulation code to perform the demodulation, the demodulation code provided by a designer of the hardware demodulator circuit.

18. The system of claim 17, wherein the system further comprises a non-volatile storage to store the demodulation code.

19. The system of claim 18, wherein the non-volatile storage is to store a radio stack, the radio stack comprising:
a control application programming interface to interact with a radio application;
the demodulation code;
a topology selection module to control interaction with the at least one tuner; and
an implementation selection module to control interaction with the demodulation code when the hardware demodulator circuit is not present.

20. The system of claim 13, wherein the interconnection member comprises one or more switches to enable coupling of at least a portion of the first interconnect circuitry with at least a portion of the second interconnect circuitry.

* * * * *